United States Patent [19]

Kumagawa et al.

[11] Patent Number: 4,725,484

[45] Date of Patent: Feb. 16, 1988

[54] DIMENSIONALLY STABLE POLYIMIDE FILM AND PROCESS FOR PREPARATION THEREOF

[75] Inventors: Kiyoshi Kumagawa; Kenji Kuniyasu; Toshiyuki Nishino; Yuji Matsui, all of Ube, Japan

[73] Assignee: Ube Industries, Ltd., Yamaguchi, Japan

[21] Appl. No.: 864,299

[22] Filed: May 16, 1986

[30] Foreign Application Priority Data

May 17, 1985 [JP] Japan .................. 60-103674
May 17, 1985 [JP] Japan .................. 60-103675

[51] Int. Cl.⁴ .................. B32B 27/28; B32B 27/34; C08G 69/26
[52] U.S. Cl. .................. 428/220; 428/473.5; 428/901; 528/353
[58] Field of Search .................. 428/473.5, 220, 901; 528/353; 264/212

[56] References Cited

FOREIGN PATENT DOCUMENTS 007805  1/1980  Japan .................. 264/166
0007805 1/1980  Japan .................. 264/166

Primary Examiner—Thomas J. Herbert
Attorney, Agent, or Firm—Burgess, Ryan & Wayne

[57] ABSTRACT

A dimensionally stable polyimide film and processes for the preparation thereof. The polyimide film is composed of an aromatic polyimide obtained from a solution of a polymer formed by polymerization of a biphenyl-tetracarboxylic acid and a phenylene diamine, wherein the average linear expansion coefficient of the polyimide film in the temperature range of from 50° C. to 300° C. is $0.1 \times 10^{-5}$ to $2.5 \times 10^{-5}$ cm/cm.°C., the ratio of the linear expansion coefficient in the machine direction of the film to the linear expansion coefficient in the transverse direction of the film is in the range of from 1/5 to 4, and the thermal dimension stability expressed by the ratio of the change of the size of the film at normal temperature after the heat treatment where the temperature is elevated to 400° C. from normal temperature and the film is maintained at 400° C. for 2 hours is less than 0.3%.

9 Claims, No Drawings

DIMENSIONALLY STABLE POLYIMIDE FILM AND PROCESS FOR PREPARATION THEREOF

BACKGROUND OF THE INVENTION

1. Field of the Invention

The present invention relates to a process for preparing an aromatic polyimide film having excellent thermal dimension stability from a solution of a polyimide precursor (for example, an aromatic polyamic acid) obtained from a biphenyl-tetracarboxylic acid and a phenylene diamine by a solution casting method or the like. More particularly, the present invention relates to a thermally stable aromatic polyimide film having a high thermal dimension stability (or a low thermal size change) and an average linear expansion coefficient which is substantially equal to the linear expansion coefficient of a ceramic or metal, and a process for the preparation thereof.

This polyimide film is very valuable as a base film of a printed circuit board ordinarily used for an electric or electronic part.

2. Description of the Related Art

An aromatic polyimide film obtained from pyromellitic dianhydride and an aromatic diamine is used as a typical instance of the aromatic polyimide film. Since the average linear expansion coefficient of this polyimide film in the unoriented state is as large as about $3.5 \times 10^{-5}$ to about $4.5 \times 10^{-5}$ cm/cm.° C., when the film is bonded to a copper foil or the like at a high temperature, a large amount of curling occurs.

As means for solving this problem, GB-A-No. 1098556 proposes a method in which the drawing operation is carried out at the film-forming step to reduce the average linear expansion coefficient of the film. However, the film obtained according to this method is defective in that the ratio of the change of the size at normal temperature after the heat treatment where the temperature is elevated to about 400° C. from normal temperature and the film is maintained at this temperature for 2 hours (thermal dimension stability) is very bad, and therefore, the film cannot cope with increase of the wiring density in a wiring pattern.

SUMMARY OF THE INVENTION

Research was conducted with a view to developing a process for preparing an aromatic polyimide film having such an average linear expansion coefficient that when the film is bonded to a ceramic or metal (for example, a copper foil or copper alloy foil) at a high temperature, no large curling occurs, and also having a good thermal dimension stability. As the result, it was found that if a thin layer of a solution of an aromatic polyamic acid or the like obtained by polymerization of a biphenyl-tetracarboxylic acid and a phenylene diamine is formed on the surface of a support and the thin layer is dried in two stages, that is, on the support and under a low tension in the state of a solidified film member peeled from the support, an excellent aromatic polyimide film having a specific low linear expansion coefficient and a high thermal dimension stability can be obtained. We have now completed the present invention based on this finding.

More specifically, in accordance with the present invention, there is provided a dimensionally stable polyimide film composed of an aromatic polyimide obtained from a solution of a polymer formed by polymerization of a biphenyl-tetracarboxylic acid and a phenylene diamine, wherein the average linear expansion coefficient of the polyimide film in the temperature range of from 50° C. to 300° C. is $0.1 \times 10^{-5}$ to $2.5 \times 10^{-5}$ cm/cm.° C., the ratio (MD/TD) of the linear expansion coefficient in the machine direction (MD direction) of the film to the linear expansion coefficient in the transverse direction (TD direction) of the film is in the range of from 1/5 to 4, and the thermal dimension stability expressed by the ratio of the change of the size of the film at normal temperature after the heat treatment where the temperature is elevated to 400° C. from normal temperature and the film is maintained at 400° C. for 2 hours is less than about 0.3%.

Furthermore, in accordance with the present invention, there is provided a process for the preparation of a dimensionally stable polyimide film, which comprises preparing a solution of a polymer formed by polymerization of a biphenyl-tetracarboxylic acid and a phenylenediamine in an organic polar solvent, forming a thin layer of the solution on the surface of a support, first drying the thin layer to form a solidified film member in which the solvent and formed water are present in an amount of 27 to 60% by weight, peeling the solidified film member from the surface of the support, second drying the film member under a tension lower than 100 g/mm² at a temperature of 80° to 250° C. to form a solidified film which contains the solvent and formed water in an amount of 5 to 25% by weight, and drying and heat-treating the solidified film at a temperature of 200° to 500° C., which is higher than said second drying temperature, in the state where at least one pair of both the opposite edges of the film are fixed, to form a polyimide film.

The dimensionally stable polyimide film of the present invention may also be prepared by another process which comprises preparing a solution of a polymer formed by polymerization of a biphenyl-tetracarboxylic acid and a phenylene diamine in an organic polar solvent, forming a thin layer of the solution on the surface of a support, drying the thin layer to form a solidified film in which the solvent and formed water are present in an amount of 20 to 60% by weight, peeling the solidified film from the surface of the support, drying and heat treating the solidified film at a temperature of 200° to 500° C. in the state where at least one pair of both the end edges are fixed to form and aromatic polyimide film, and again heat treating the aromatic polyimide film under a tension lower than 400 g/mm² at a temperature of 250° to 500° C.

DESCRIPTION OF THE PREFERRED EMBODIMENTS

The aromatic polyimide film of the present invention is a novel, dimensionally stable, heat-resistant, aromatic polyimide film which has an average linear expansion coefficient which is approximately equal to those of various inorganic materials including ceramic materials, electroconductive metals and magnetic metal alloys customarily used for electronic materials. The film also has such a property that the thermal dimension stability expressed by the ratio of the change of the size after a high-temperature heat treatment is very good.

Since the average thermal expansion coefficient of the aromatic polyimide film of the present invention is very close to that of an electroconductive metal and the aromatic polyimide film of the present invention is excellent in the thermal dimension stability, when a film (foil) of an electroconductive metal is formed on or bonded to the film of the present invention, curling or the like is not caused even on exposure to a high temperature. Moreover, when a composite material (laminate material) comprising an electroconductive metal and a layer of the film of the present invention undergoes a high-temperature heat history at such processing as etching of the metal layer or soldering, curling or degradation of the properties of the processed product is not caused.

The processes of the present invention are excellent film-forming processes in which a dimensionally stable aromatic polyimide film having all of the above-mentioned excellent properties can be prepared intermittently or continuously and a film which is stable in the foregoing excellent properties can be prepared with good reproducibility on an industrial scale.

The processes of the present invention are most characterized by the specific two-staged drying or heat treating where a thin layer is prepared from a solution of a specific polyamic acid or the like on the surface of a support by the solution casting method, the thin layer of the solution is dried on the support to form a solidified film member containing a solvent at a high ratio, the solidified film member is peeled from the support and the film member is dried or heat treated under a low tension to form a solidified film having a low solvent content.

It has not been known that an aromatic polyamide film having excellent properties can be prepared according to a process as provided by the present invention.

The polyimide film of the present invention is a film of an aromatic polyimide obtained, by using as a film-forming dope a polymer solution of a high-molecular-weight polymer (polyimide precursor) formed by polymerizing a biphenyl-tetracarboxylic acid (aromatic tetracarboxylic acid component) such as 2,3,3′, 4′-biphenyl-tetracarboxylic acid, 3,3′,4,4′-biphenyl-tetracarboxylic acid or a derivative thereof, for example, an acid anhydride, an acid ester or an acid halide, and a phenylene diamine (aromatic diamine component) such as o-phenylene diamine, m-phenylene diamine or p-phenylene diamine, homogeneously dissolved in an organic polar solvent.

Accordingly, the film of the present invention is composed of a high-molecular-weight aromatic polyimide comprising at least 90 mole %, especially at least 95 mole %, of recurring units represented by the following general formula (I):

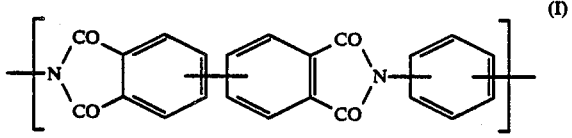

The polyimide film of the present invention is composed of the above-mentioned polyimide and the average linear expansion coefficient of the film is very small and $0.1 \times 10^{-5}$ to $2.5 \times 10^{-5}$ cm/cm.° C., preferably $0.5 \times 10^{-5}$ to $2.3 \times 10^{-5}$ cm/cm.° C. Moreover, the ratio (MD/TD) of the linear expansion coefficient in the machine direction (MD direction) of the film to the linear expansion coefficient in the transverse direction (TD direction) of the film is from 1/5 to 4, preferably from 1/3 to 3.0. Furthermore, the value of the thermal dimension stability is less than 0.3%, preferably less than 0.25%.

The aromatic polyimide of the present invention having all of the foregoing properties has not been known, and the film of the present invention is a polyimide film having novel properties. When a composite material (laminate material) is prepared by bonding the aromatic polyimide film of the present invention to a thin sheet (or foil) of an inorganic substance (ceramic material or the like) or an electroconductive metallic substance directly or through an adhesive, or when this composite material is further processed or used, even if it is exposed to a high temperature, curling is not caused or the dimension is not thermally changed.

The polyimide film of the present invention is substantially free of the organic polar solvent contained in the film-forming dope or water formed by imidization. It is preferred that the content of volatile components such as the solvent be lower than 1% by weight, especially lower than 0.5% by weight. Furthermore, the film of the present invention is a flexible film having a thickness of 1 to 150 μm.

The processes for the preparation of the polyimide film of the present invention will now be described. At first, a polymer solution comprising a polymer (polyimide precursor such as an aromatic polyamic acid) formed by polymerizing an aromatic tetracarboxylic acid component containing preferably at least 90 mole % of the above-mentioned biphenyl-tetracarboxylic acid and an aromatic diamine component containing preferably at least 90 mole % of the above-mentioned phenylene diamine in an organic polar solvent at a polymerization temperature preferably lower than 100° C., especially preferably lower than 80° C., which is homogeneously dissolved in an organic polar solvent, is prepared as the film-forming dope.

The polyimide precursor is a polymer obtained by polymerizing a biphenyl-tetracarboxylic acid or an anhydride thereof and a phenylene diamine, and an aromatic polyamic acid which is soluble in an organic polar solvent and contains at least 50 mole %, especially at least 60 mole %, of recurring units represented by the following general formula (II):

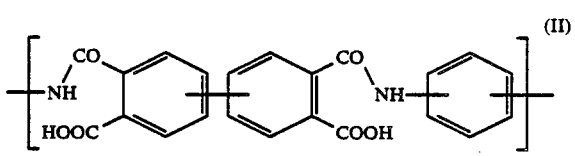

is preferred.

The organic polar solvent is used as the polymerization solvent or the solvent of the film-forming dope. Any of organic solvents capable of homogeneously dissolving therein the respective monomers and the polyimide precursor may be used. For example, there are preferably used amide type solvents such as N,N-dimethylformamide, N,N-diethylformamide, N,N-dimethylacetamide, N,N-diethylacetamide, N-methyl-2-pyrrolidone and hexamethylene-phosphoramide, and pyridine, dimethylsulfoxide, tetramethylurea, cresol and phenol.

It is preferred that the logarithmic viscosity number (or inherent viscosity number) (as determined in a solution of the polymer in N-methyl-2-pyrrolidone at a concentration of 0.5 g/100 ml and at a temperature of 30° C.) of the polyimide precursor used in the processes of the present invention be about 0.1 to 5, especially 0.2 to 4. Moreover, it is preferred that the polymer concentration in the polymer solution be 2 to 40% by weight, especially 3 to 30% by weight. It is sufficient if the rotation viscosity (as measured at 30° C.) of the polymer solution is 10 to 50,000 poises.

According to the first process of the present invention, after the preparation of the above-mentioned dope, (a) a thin layer of the dope having a uniform thickness is formed preferably continuously or intermittently on the surface of a support such as a metal drum or belt having a smooth surface according to the known solution-casting method. Then, (i) the solvent in the thin layer and formed water are gradually evaporated at a drying temperature of preferably 40° to 180° C., especially 50° to 150° C., to dry the thin layer on the support, and (ii) a solidified film member in which the solvent and formed water are left in an amount 27 to 60% by weight, preferably 30 to 50% by weight, is formed. Then, (b) the solidified film member is peeled from the surface of the support, and the solidified film member is dried (i) in a substantially free state or under a tension lower than 100 g/mm$^2$, preferably lower than 80 g/mm$^2$, (ii) at a drying temperature of 80° to 250° C., preferably 100° to 230° C., for 1 to 200 minutes, especially 2 to 100 minutes, whereby a solidified film containing the solvent and formed water in an amount of 5 to 25% by weight, preferably 10 to 23% by weight, is formed preferably continuously or intermittently.

It is preferred that the elevation of the temperature from the drying temperature of the first stage to the drying temperature of the second stage be accomplished within a relatively short time. For example, a temperature-elevating rate of at least 10° C./min is preferred.

In the process, when the solidified film member peeled from the support is dried, if the tension imposed on the film member is increased, the average linear expansion coefficient of the finally obtained film can be reduced. Accordingly, this average linear expansion coefficient can be adjusted to a desired value within the above-mentioned range.

In the process, the above-mentioned two drying steps in (a) and (b) are very important, and if the above-mentioned drying means or drying conditions are not adopted, the intended dimensionally stable polyimide film cannot be obtained, or many wrinkles are formed on the surface of the formed film or the surface is coarsened with many convexities and concavities and a film having a smooth appearance cannot be obtained. If the tension imposed on the solidified film member at the drying step in (b) exceeds 100 g/mm$^2$, abnormal deformation of the film, degradation of the flatness and formation of slacks or wrinkles are caused. If the drying temperature at the drying step in (b) is higher than 250° C., many large and small wrinkles or fine voids are formed in the film. If the drying temperature at the drying step in (b) is lower than 80° C., a long time is necessary for completing the drying step (b) and the process becomes industrially disadvantageous.

In the process, subsequently to the above-mentioned drying step, the solidified film supplied continuously or intermittently is dried and/or heat-treated at a temperature of 200° to 500° C., preferably 250° to 450° C., which is higher than the above-mentioned drying temperature, for preferably 1 to 200 minutes, especially 2 to 100 minutes, in the state where at least one pair of both the opposite edges of the solidified film are fixed by a fixing device or the like capable of moving continuously or intermittently together with the solidified film, whereby the volatile components such as the solvent are sufficiently removed from the film so that the content of the solvent and formed water in the finally obtained polyimide film is preferably lower than 1% by weight and the polymer constituting the film is sufficiently imidized. The film is sufficiently heat-treated to form a dimensionally stable aromatic polyimide film having all of the above-mentioned excellent properties.

If the aromatic polyimide film prepared at the above-mentioned last step is further heat-treated under a low tension, preferably a tension lower than 400 g/mm$^2$, especially preferably a tension lower than 300 g/mm$^2$, at a temperature of 250° to 500° C., especially 300° to 450° C., for 1 to 30 minutes, especially 2 to 20 minutes, a heat-resistant polyimide film having a further improved thermal dimension stability can be obtained.

According to the second process of the present invention, after the preparation of the above-mentioned dope, a thin layer of the dope having a uniform thickness is formed preferably continuously or intermittently on the surface of a support such as a metal drum or belt having a smooth surface according to the known solution-casting method. Then, the volatile component containing the solvent in the thin layer and water formed through the imidization of the polyimide precursor is gradually evaporated at a drying temperature of preferably 40° to 180° C., especially 50° to 150° C., to dry the thin layer on the support, and a solidified film in which the solvent and formed water are left in an amount 20 to 60% by weight, preferably 25 to 50% by weight, is formed.

The solidified film continuously or intermittently fed is then dried and/or heat treated at a temperature of 200° to 500° C., preferably 250° to 450° C. for 1 to 60 min., especially 2 to 30 min., preferably in the state where the pair of the opposite side edges are fixed to form an aromatic polyimide film. As the results, the solidified film is dried to remove the solvent and formed water therefrom so that the finally resulting film should preferably have a solvent content of less than about 1% by weight, and also allowed the polymer constituting the film to be well imidized and the film to be well heat treated.

In the second process, the aromatic polyimide film prepared at the above-mentioned step is finally heat-treated under a low tension, preferably a tension lower than 400 g/mm$^2$, especially preferably a tension lower than 300 g/mm$^2$, at a temperature of 250° to 500° C., preferably 300° to 450° C., more preferably 330° to 450° C., for 1 to 30 minutes, especially 2 to 20 minutes, to obtain a heat-resistant polyimide film having an improved thermal dimension stability.

As the apparatus for fixing the solidifying film, there is preferably used an apparatus comprising a pair of belts or chains having many pins or holding members arranged equidistantly, which are disposed along both the side edges of the solidified film supplied continuously or intermittently, wherein the film is fixed while moving the belts or chains continuously or intermittently together with the film. Furthermore, in the apparatus for fixing the solidified film, th film being heat-treated may be contracted or elongated in the transverse direction or machine direction at an appropriate contraction or elongation ratio (preferably a contraction or elongation ratio of 0.5 to 5%).

The long aromatic polyimide film prepared continuously or intermittently according to the processes of the present invention may be wound in the form of a roll according to a known method.

The present invention will be further illustrated by the following illustrative but not limitative examples.

In the following examples and comparative examples, the average linear expansion coefficient ($\alpha$; cm/cm/° C.) was determined according to the following procedures. Namely, a test piece (5 mm×20 mm) was set at a thermal mechanical analysis apparatus (supplied by Rigaku Denki K. K.) adopting the tensile load method, and the temperature was elevated at a rate of 10° C./min to 300° C. from normal temperature. The test piece was maintained at 300° C. for 1 minute, and the temperature was lowered to normal temperature at a rate of 5° to 20° C./min. The average linear expansion coefficient calculated from the change ($\Delta L_1$) of the length observed when the temperature was lowered from 300° C. to 50° C. and the original length ($L_1$; 10 mm) of the test piece according to the following calculation formula:

$$\alpha = (\Delta L_1/L_1)/300-50)$$

The thermal dimension stability was determined according to the following procedures. A dehydrated test piece (5 mm×20 mm) was set at the same thermal mechanical analysis apparatus as described above, and the temperature was elevated at a rate of 10° C./min from normal temperature to 400° C. The test piece was maintained at 400° C. for 2 hours and the temperature was lowered at a rate of 5° to 20° C./min to normal temperature. The thermal dimension stability was calculated from the difference ($\Delta L_2$) between the length of the test piece at normal temperature before the heating and the length of the test piece at normal temperature after the heating and the original length ($L_2$; 10 mm) of the test piece according to the following calculation formula:

$$A = (\Delta L_2/L_2) \times 100$$

EXAMPLE 1

(Preparation of Dope)

A cylindrical polymerization tank having an inner capacity of 50 l was charged with 38.1 kg of N,N-dimethylacetamide, and 5.2959 kg of 3,3',4,4'-biphenyltetracarboxylic dianhydride was added and 1.9466 kg of p-phenylene diamine was gradually added with stirring. The reaction liquid was stirred at 30° C. for about 10 hours to effect polymerization between both the components and form a polyamic acid.

The logarithmic viscosity number (as determined at 30° C.) of the polyamic acid formed by the polymerization reaction was 3.10, and the rotation viscosity (as determined at 30° C.) of the solution of the polyamic acid was 25,000 poise.

(Formation of the Film)

The solution of the polyamic acid was used as the film-forming dope. The dope was extruded at 30° C. in the form of a thin layer through a slit of T-die (lip distance =0.5 mm, lip width =650 mm), and the thin layer of the dope was continuously supplied onto a smooth metal belt and was subjected to the drying of the first stage on the belt by hot air maintained at about 120° C. to form a solidified film member. Then, the solidified film member was peeled from the belt and was cut into a square piece having a side of 200 mm. One side of the square piece of the film member was secured to a frame by a pin sheet, and a load of about 35 g was uniformly applied to the opposite sides of the square piece along the entire width thereof by dancers to place the square piece under a low tension (a tension of 7.0 g/mm² with respect to the machine direction of the solidified film member). In this state, the temperature was elevated to 190° C. over a period of about 30 seconds and the drying of the second stage was carried out at 190° C. for 5 minutes to form a solidified film. The four sides of the square piece of the solidified film were held and fixed by pin tenter, and the temperature of the solidified film was elevated at a rate of about 10° C./min and the film was dried and heat-treated (imidized) at 450° C. for 30 minutes to form an aromatic polyimide film having a thickness of 25 µm.

The contents of the volatile components such as the solvent and formed water in the solidified film member after the drying of the first stage, the solidified film after the drying of the second stage under a low tension and the aromatic polyimide film, and the properties of the obtained aromatic polyimide film are shown in Table 1.

COMPARATIVE EXAMPLE 1

An aromatic polyimide film was prepared in the same manner as described in Example 1 except that the square piece of the solidified film member was not subjected to the drying of the second stage but was directly dried and heat-treated in the high-temperature heat treatment apparatus.

The obtained results are shown in Table 1.

EXAMPLE 2

A solution of a polyamic acid prepared in the same manner as described in Example 1 was used as the film-forming dope, and the dope was extruded at about 30° C. in the form of a thin layer through a slip of a T-die (lip distance =0.5 mm, lip width =650 mm) and the thin layer of the dope was continuously placed on a smooth metal belt. The film was subjected to the drying of the first stage on the belt by hot air maintained at about 120° C. to form a solidified film member continuously. Then, the solidified film member was peeled from the belt and was supplied to a longitudinal furnace (drying temperature =180° C.) under a low tension (shown in Table 1) produced by dancers and passed through the furnace over a period of about 4 minutes to effect the drying of the second stage and form a solidified film. Then, the solidified film was supplied into a high-temperature heating furnace, and in this furnace, both the end edges in the machine direction of the film were held by a lateral tenter and the film was dried and heat-treated by hot air, the temperature of which was gradually elevated from about 250° C. to about 450° C., while moving the film through the furnace, whereby imidization was effected and an aromatic polyimide film was continuously prepared. Finally, the film was wound in the form of a roll under cooling.

Wrinkles were not formed when the dried and heat-treated aromatic polyimide film was wound in the form of a roll, and the appearance of the rolled film was good.

In the aromatic polyimide film obtained according to the above-mentioned film-forming process, the imidization degree was at least 95%, and the heat resistance expressed by the thermal decomposition-initiating temperature was higher than 450° C. Furthermore, when the physical properties of the film in the MD direction were measured at the tensile test at 20° C., it was found that the tensile strength was 55 kg/mm², the elongation was 47% and the initial tensile elasticity modulus was 870 kg/mm².

The properties of the films at the respective stages of the above-mentioned film-forming process and the properties of the obtained aromatic polyimide film are shown in Table 1.

Comparative Example 2

An aromatic polyimide film was prepared in the same manner as described in Example 2 except that the drying of the second stage was not carried out at all. The obtained results are shown in Table 1.

EXAMPLE 3 physical properties of the film in the MD direction were determined at the tensile test at 20° C., it was found that the tensile strength was 52 kg/mm², the elongation was 37% and the initial tensile elasticity modulus was 1010 kg/mm².

The obtained results are shown in Table 1.

EXAMPLE 5

An aromatic polyimide film was prepared in the same manner as described in Example 2 except that the width of the lateral pin tenter in the high-temperature heat treatment furnace was gradually increased so that the width of the pin tenter at the maximum temperature zone of the furnace was about 1.04 times the width at the outlet of the furnace.

The obtained results are shown in Table 1.

TABLE 1

| | Content (% by weight) of Volatile Components | | | Tension (g/mm²) on Solidified Film Member at Drying of Second Stage | | Linear Expansion Coefficient (cm/cm/°C.) ($\times 10^{-5}$) | | Thermal Dimension Stability (%) | |
|---|---|---|---|---|---|---|---|---|---|
| | Solidified Film Member after Drying of First Stage | Solidified Film after Drying of Second Stage | Aromatic Polyimide Film after Heat Treatment | MD | TD | MD | TD | MD | TD |
| Example 1 | 35 | 13.0 | below 0.01 | 7.0 | free | 1.8 | 2.0 | 0.18 | 0.27 |
| Comparative Example 1 | 35 | — | below 0.01 | — | — | 1.1 | 1.3 | 0.50 | 0.47 |
| Example 2 | 33 | 17.0 | below 0.01 | 10 | free | 1.6 | 1.7 | 0.15 | 0.09 |
| Comparative Example 2 | 33 | — | below 0.01 | — | — | 0.5 | 0.8 | 0.52 | 0.42 |
| Example 3 | 33 | 17.5 | below 0.01 | 40 | free | 1.0 | 1.8 | 0.21 | 0.10 |
| Example 4 | 33 | 18.0 | below 0.01 | 80 | free | 1.1 | 1.3 | 0.23 | 0.18 |
| Example 5 | 33 | 18.0 | below 0.01 | 10 | free | 1.4 | 1.2 | 0.18 | 0.17 |

An aromatic polyimide film having a thickness of 25 μm was prepared in the same manner as described in Example 2 except that the tension applied at the drying of the second stage was changed to 40 g/mm².

When the dried and heat-treated aromatic polyimide film was wound in the form of a roll, wrinkles were not formed at all, and the appearance of the rolled film was good.

In the obtained aromatic polyimide film, the imidization degree was at least 95%, and the heat resistance of the film expressed by the thermal decomposition-initiating temperature was higher than 450° C. When the physical properties of the film in the MD direction were measured at the tensile test at 20° C., it was found that the tensile strength was 50 kg/mm², the elongation was 44% and the initial tensile elasticity modulus was 940 kg/mm².

The volatile component contents and properties of the films at the respective stages of the above-mentioned film-forming process are shown in Table 1.

EXAMPLE 4

An aromatic polyimide film having a thickness of 25 μm was prepared in the same manner as described in Example 2 except that at the drying of the second stage, both the end edges of the solidified film member in the machine direction were held at a certain distance so that a tension of about 80 g/mm² was imposed on the film member.

When the dried and heat-treated aromatic polyimide film was wound in the form of a roll, wrinkles were not formed at all and the appearance of the film in the rolled state was very good.

In the obtained aromatic polyimide film, the imidization degree was at least 95%, and the heat resistance of the film expressed by the thermal decomposition-initiating temperature was higher than 450° C. When the

EXAMPLE 6

(Preparation of Dope)

A cylindrical polymerization tank having an inner capacity of 50 l was charged with 38.1 kg of N,N-dimethylacetamide, and 5.2959 kg of 3,3',4,4'-biphenyltetracarboxylic dianhydride was added and 1.9466 kg of p-phenylene diamine was gradually added with stirring. The reaction liquid was stirred at 30° C. for about 10 hours to effect polymerization between both the components and form a polyamic acid.

The logarithmic viscosity number (as determined at 30° C.) of the polyamic acid formed by the polymerization reaction was 3.10, and the rotation viscosity (as determined at 30° C.) of the solution of the polyamic acid was 25,000 poise.

(Formation of Film)

The solution of the polyamic acid was used as the film-forming dope. The dope was extruded at 30° C. in the form of a thin layer through a slit of a T-die (lip distance =0.5 mm, lip width =650 mm), and the thin layer of the dope was continuously supplied onto a smooth metal belt and was subjected to the drying of the first stage on the belt by hot air maintained at about 120° C. to form a solidified film. Then, the solidified film was peeled from the belt and was fed into a high-temperature heating furnace. In this furnace, both the end edges in the machine direction of the film were held by a lateral tenter and the film was dried and heat-treated by hot air, the temperature of which was gradually elevated from about 250° C. to about 450° C., while moving the film through the furnace, whereby imidization was effected and an aromatic polyimide film was continuously prepared. Finally, the film was supplied to a longitudinal high-temperature heating furnace under a low tension of 100 g/mm² applied to the longitudinal direction of the film by dancers to heat the film at a heating temperature of about 350° C. for 4 min., cooled and then wound in the form of a rool.

Wrinkles were not formed when the dried and heat-treated aromatic polyimide film was wound in the form of a roll, and the appearance of the rolled film was good.

In the aromatic polyimide film obtained according to the above-mentioned film-forming process, the imidization degree was at least 95%, and the heat resistance expressed by the thermal decomposition-initiating temperature was higher than 450° C. Furthermore, when the physical properties of the film in the MD direction were measured at the tensile test at 20° C., it was found that the tensile strength was 43 kg/mm², the elongation was 35% and the initial tensile elasticity modulus was 1005 kg/mm².

The properties of the films at the respective stages of the above-mentioned film-forming process and the properties of the obtained aromatic polyimide film are shown in Table 2.

COMPARATIVE EXAMPLE 3

An aromatic polyimide film was prepared in the same manner as described in Example 6 except that the final drying and heat treatment in the longitudinal high-temperature heating furnace were not carried out at all. The obtained results are shown in Table 2.

TABLE 2

| | Content (% by weight) of Volatile Components | | Tension (g/mm²) on Solidified Film Member at Drying of Second Stage | | Linear Expansion Coefficient (cm/cm/°C.) ($\times 10^{-5}$) | | Thermal Dimension Stability (%) | |
| --- | --- | --- | --- | --- | --- | --- | --- | --- |
| | Solidified Film Member after Drying of First Stage | Aromatic Polyimide Film after Heat Treatment | MD | TD | MD | TD | MD | TD |
| Example 6 | 33 | below 0.01 | 100 | free | 1.4 | 1.6 | 0.20 | 0.18 |
| Comparative Example 3 | 33 | below 0.01 | — | — | 0.8 | 1.0 | 0.47 | 0.35 |

We claim:

1. A dimensionally stable polyimide film composed of an aromatic polyimide obtained from a solution of a polymer formed by polymerization of a biphenyl-tetracarboxylic acid and a phenylene diamine, wherein the average linear expansion coefficient of the polyimide film in the temperature range of from 50° C. to 300° C. is $0.1 \times 10^{-5}$ to $2.5 \times 10^{-3}$ cm/cm.° C., the ratio (MD/TD) of the linear expansion coefficient in the machine direction (MD direction) of the film to the linear expansion coefficient in the transverse direction (TD direction) of the film is in the range of from 1/5 to 4, and the thermal dimension stability expressed by the ratio of the change of the size of the film at normal temperature after the heat treatment where the temperature is elevated to 400° C. from normal temperature and the film is maintained at 400° C. for 2 hours is less than 0.3%.

2. A polyimide film as set forth in claim 1, which is flexible and has a thickness of 1 to 150 μm.

3. A polyimide film as set forth in claim 1, wherein the average linear expansion coefficient is $0.5 \times 10^{-5}$ to $2.3 \times 10^{-5}$ cm/cm.° C.

4. A polyimide film as set forth in claim 1, wherein the MD/TD ratio is from 1/3 to 3.0.

5. A polyimide film as set forth in claim 1, wherein the thermal dimension stability is less than 0.25%.

6. A polyimide film as set forth in claim 1, which is composed of a high-molecular-weight aromatic polyimide comprising at least 90 mole % of recurring units represented by the following general formula (I):

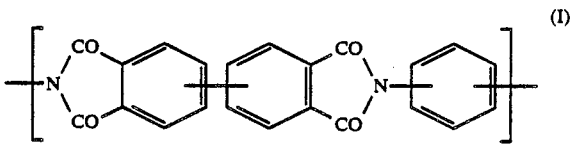

7. A polyimide film as set forth in claim 6, wherein the high-molecular-weight aromatic polyimide comprises at least 95 mole % of said recurring units.

8. A polyimide film as set forth in claim 1, wherein the content of volatile components is lower than 1% by weight.

9. A polyimide film as set forth in claim 8, wherein the content of volatile components is lower than 0.5% by weight.